(12) United States Patent
Wang et al.

(10) Patent No.: US 9,274,346 B2
(45) Date of Patent: Mar. 1, 2016

(54) MULTI-VIEW AUTO-STEREOSCOPIC DISPLAY

(71) Applicant: AU Optronics Corporation, Hsin-Chu (TW)

(72) Inventors: Chih-Chieh Wang, Hsin-Chu (TW); Chih-Chang Shih, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 14/547,420

(22) Filed: Nov. 19, 2014

(65) Prior Publication Data

US 2015/0260999 A1 Sep. 17, 2015

(30) Foreign Application Priority Data

Mar. 11, 2014 (TW) .............................. 103108429 A

(51) Int. Cl.
*G02B 27/22* (2006.01)
*G02B 27/26* (2006.01)
*G02F 1/1335* (2006.01)

(52) U.S. Cl.
CPC ............ *G02B 27/2214* (2013.01); *G02B 27/26* (2013.01); *G02F 1/133526* (2013.01); *G02F 1/133528* (2013.01); *G02F 2001/133562* (2013.01); *G02F 2001/133567* (2013.01)

(58) Field of Classification Search
CPC ................. G02B 27/2214; G02F 1/134327; G02G 27/2214; H04N 13/0404; H04N 13/0402
See application file for complete search history.

(56) References Cited

U.S. PATENT DOCUMENTS

| 5,392,140 | A | | 2/1995 | Ezra et al. | |
|---|---|---|---|---|---|
| 5,465,175 | A | * | 11/1995 | Woodgate | G02B 27/2214 348/E13.029 |
| 8,724,039 | B2 | | 5/2014 | Huang et al. | |
| 2010/0328440 | A1 | * | 12/2010 | Willemsen | G02B 27/2214 348/59 |
| 2012/0113153 | A1 | | 5/2012 | Casner | |
| 2012/0236411 | A1 | | 9/2012 | Wu | |
| 2012/0293468 | A1 | | 11/2012 | Chen | |
| 2014/0300709 | A1 | | 10/2014 | Futterer et al. | |

FOREIGN PATENT DOCUMENTS

| CN | 102681071 | 9/2012 |
|---|---|---|
| CN | 203117546 | 8/2013 |
| CN | 203365868 U | 12/2013 |
| TW | M421514 | 1/2012 |
| TW | 201248273 | 12/2012 |
| TW | 201317636 A | 5/2013 |

* cited by examiner

*Primary Examiner* — Anne Hines
(74) *Attorney, Agent, or Firm* — WPAT, P.C.; Justin King

(57) ABSTRACT

A multi-view auto-stereoscopic display is provided. The multi-view auto-stereoscopic display includes a light source, a first lenticular lens, a display module, and a second lenticular lens. The light source sequentially provides a plurality of light according to a plurality of timings in a cycle. The first lenticular lens is disposed in front of the light source and respectively directs the light from the light source to travel in a plurality of directions. The display module is disposed in front of the first lenticular lens and transforms the light from the first lenticular lens into a plurality of pixel light. The second lenticular lens is disposed in front of the display module and respectively directs the pixel light toward a plurality of views.

17 Claims, 13 Drawing Sheets

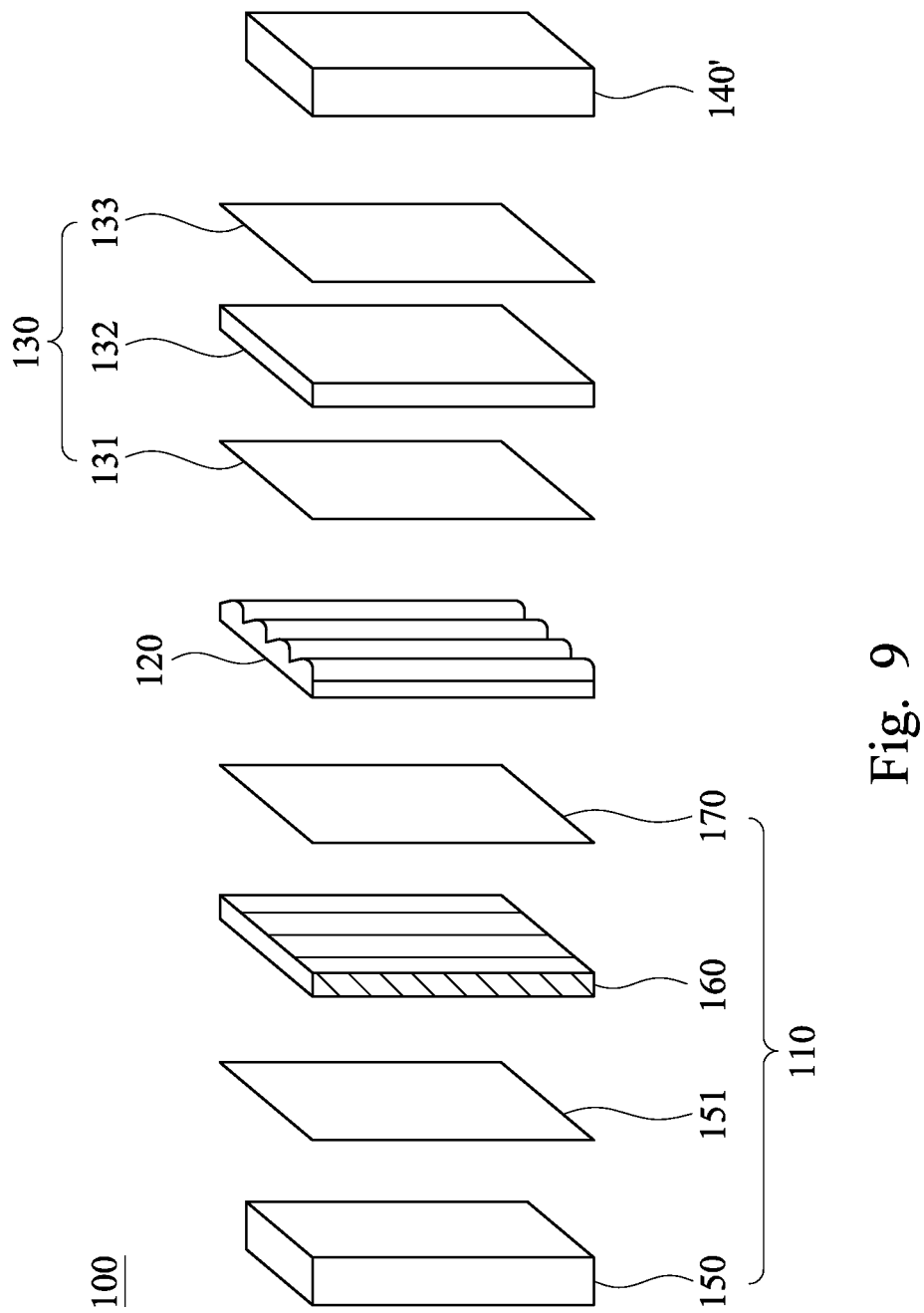

MULTI-VIEW AUTO-STEREOSCOPIC DISPLAY

RELATED APPLICATIONS

This application claims priority to Taiwan Application Serial Number 103108429, filed Mar. 11, 2014, which are herein incorporated by reference.

BACKGROUND

In the human body, the positions of the left eye and the right eye are different, and the observed images of the left eye and the right eye have a slight difference, this is the fundamental cause of stereopsis. Auto-stereoscopic televisions use the vision characteristic of the eyes to generate stereopsis.

The conventional method to generate stereopsis in technology uses a spatial multiplexing method, that is, pixels on the screen are divided into different groups by dispersing of the lens to form a plurality of views when light emitting from the pixels converges in the viewing distance. The two eyes of a human observer will observe images in different views, and this will result in the generation of stereopsis.

There are different ways to design an auto-stereoscopic television. However, when the pixels are divided into different views, the resolution may be reduced as well. At the most simple design, the number of views is inversely proportional to the resolution. For example, if the number of views is nine, the resolution drops to ninth. Reducing the decreasing rate of the resolution when the number of the views increases enhances the display effect of an auto-stereoscopic television.

SUMMARY

This disclosure provides a multi-view auto-stereoscopic display. By two specially designed and matched lenticular lenses, the decreasing rate of the resolution could be reduced when the number of the views increases.

In one embodiment, a multi-view auto-stereoscopic display is provided. The multi-view auto-stereoscopic display includes a light source, a first lenticular lens, a display module, and a second lenticular lens. The light source sequentially provides a plurality of light according to a plurality of timings in a cycle. The first lenticular lens is disposed in front of the light source and respectively directs the light from the light source to travel in a plurality of directions. The display module is disposed in front of the first lenticular lens and transforms the light from the first lenticular lens into a plurality of pixel light. The second lenticular lens is disposed in front of the display module and respectively directs the pixel light toward a plurality of views.

In one or more embodiments, the light source includes a backlight module, a first light-entering polarizer, and a liquid-crystal barrier. The backlight module provides a backlight. The first light-entering polarizer is disposed in front of the backlight module and transforms the backlight into a polarized incident light. The liquid-crystal barrier is disposed in front of the first light-entering polarizer. The liquid-crystal barrier includes a plurality of sub-regions. The sub-regions respectively transform the polarized incident light into light with different polarizations according to the timings.

In one or more embodiments, the first lenticular lens includes at least one first cylindrical lens, and a focal point of the first cylindrical lens is substantially located on one of the sub-regions.

In one or more embodiments, the display module includes a second light-entering polarizer, a liquid-crystal panel, and a second light-exiting polarizer. The second light-entering polarizer allows the light from the first lenticular lens and with a specific polarization to enter the display module and blocks the light with a polarization perpendicular to the specific polarization. The liquid-crystal panel is disposed in front of the second light-entering polarizer and transforms the light entering the display module into the pixel light. The second light-exiting polarizer is disposed in front of the liquid-crystal panel and allows the pixel light to exit the display module.

In one or more embodiments, light source includes a backlight module, a first light-entering polarizer, a liquid-crystal barrier, and a first light-exiting polarizer. The backlight module provides a backlight. The first light-entering polarizer is disposed in front of the backlight module and transforms the backlight into a polarized incident light. The liquid-crystal barrier is disposed in front of the first light-entering polarizer. The liquid-crystal barrier includes a plurality of sub-regions. The sub-regions respectively transform the polarized incident light into the light with different polarizations according to the timings. The first light-exiting polarizer allows the light with a specific polarization to exit the light source and blocks the light with a polarization perpendicular to the specific polarization.

In one or more embodiments, the display module includes a second light-entering polarizer, a liquid-crystal panel, and a second light-exiting polarizer. The second light-entering polarizer allows the light from the first lenticular lens to enter the display module and blocks the light with a polarization perpendicular to a polarization direction of the second light-entering polarizer. The liquid-crystal panel is disposed in front of the second light-entering polarizer and transforms the light entering the display module into the pixel light. The second light-exiting polarizer is disposed in front of the liquid-crystal panel and allows the pixel light to exit the display module.

In one or more embodiments, first lenticular lens is a fixed lenticular lens.

In one or more embodiments, the second lenticular lens is a fixed lenticular lens.

In one or more embodiments, the second lenticular lens is a switchable lenticular lens.

In one or more embodiments, the first lenticular lens includes a first body and at least one first cylindrical lens disposed on the first body, the first body has a first thickness $t_1$ and a first refractive index $n_1$, the first cylindrical lens has a first pitch $P_{L1}$, the second lenticular lens includes a second body and at least one second cylindrical lens disposed on the second body, the second body has a second thickness $t_2$ and a second refractive index $n_2$, the second cylindrical lens has a second pitch $P_{L2}$, a number of the timings is m, and a following relation is satisfied by the first lenticular lens and the second lenticular lens:

$$\frac{P_{L1}}{t_1/n_1} = m \times \frac{P_{L2}}{t_2/n_2}.$$

The light source sequentially emits light passing different sub-regions in a cycle, and then the first lenticular lens respectively directs the light passing different sub-regions to travel in different directions, such that a plurality of light traveling in different directions are generated in a cycle. After the light emits into the display module and the second lenticular lens, the light traveling in different directions is respectively directed toward different views by the second lenticular lens. Therefore, the number of the views generated in a cycle by the multi-view auto-stereoscopic display increases, and the decreasing rate of the resolution is reduced when the number of the views increases.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 9 is a schematic exploded view of the multi-view auto-stereoscopic display according to another embodiment of this invention.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1A:
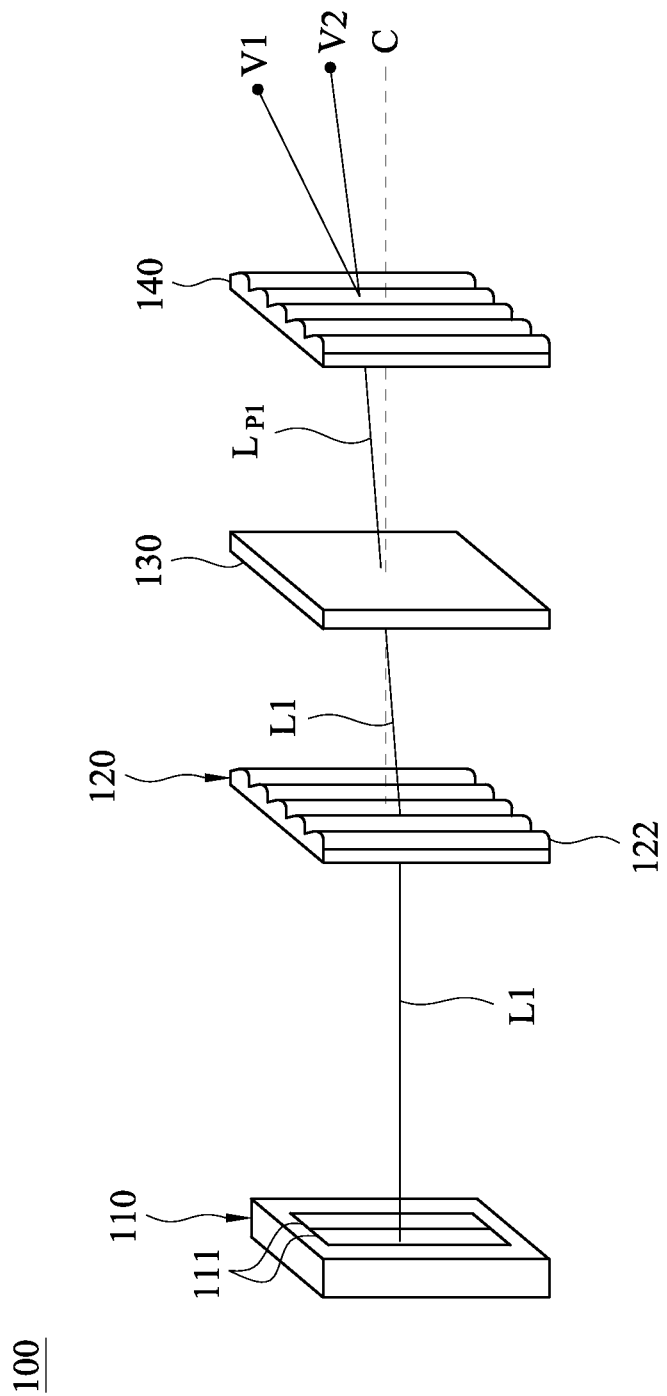
FIG. 1A is a schematic exploded view of a multi-view auto-stereoscopic display in a first timing according to one embodiment of this invention.
Figure 1B:
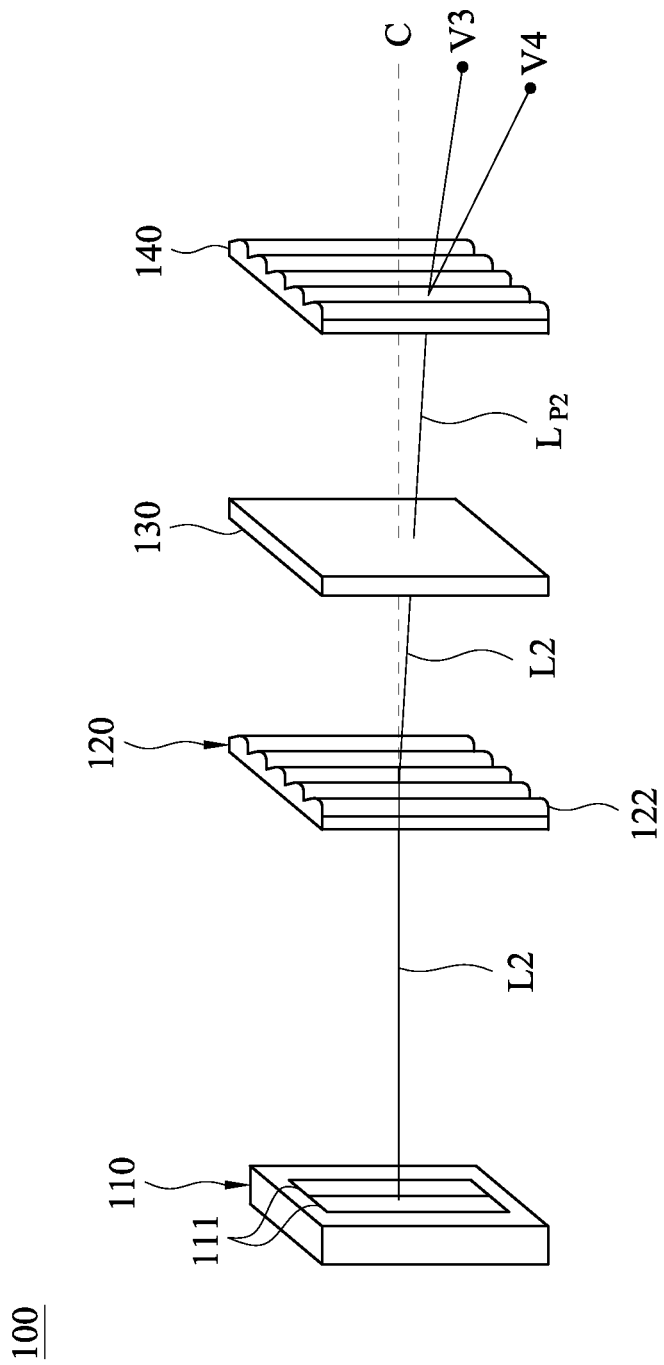
FIG. 1B is a schematic exploded view of the multi-view auto-stereoscopic display of FIG. 1A in a second timing.

FIG. 1A is a schematic exploded view of a multi-view auto-stereoscopic display 100 in a first timing according to one embodiment of this invention. FIG. 1B is a schematic exploded view of the multi-view auto-stereoscopic display 100 of FIG. 1A in a second timing. As shown in FIG. 1A and FIG. 1B, a multi-view auto-stereoscopic display 100 is provided. The multi-view auto-stereoscopic display 100 includes a light source 110, a first lenticular lens 120, a display module 130, and a second lenticular lens 140. The light source 110 sequentially provides a plurality of light according to a plurality of timings in a cycle. The first lenticular lens 120 is disposed in front of the light source 110 and configured to respectively direct the light from the light source 110 to travel in a plurality of directions. The display module 130 is disposed in front of the first lenticular lens 120, and the display module 130 is configured to provide display information and transforms the light from the first lenticular lens 120 and in different directions into a plurality of pixel light. In other words, the display module 130 is configured to modulate the brightness and color of the light from the light source 110. The second lenticular lens 140 is disposed in front of the display module 130 and configured to respectively direct the pixel light toward a plurality of views, such as V1 to V4.

The light source 110 includes a plurality of light-emitting units 111. A shape of each of the light-emitting unit 111 can be a strip, and the light-emitting units 111 are disposed side by side. Specifically, each of the light-emitting units 111 has at least two long edges, and the long edges of each of the light-emitting unit 111 are adjacent to the long edges of the neighboring light-emitting units 111.

Each of the light-emitting units 111 can include a plurality of sub-regions, that is, the light source 110 includes a plurality of sub-regions. Different sub-regions respectively configured to provide a plurality of light according to different timings. A shape of the sub-regions can be a stripe, and the sub-regions are disposed side by side. Each sub-region can have at least two edges, and the long edges of each of the sub-regions are adjacent to the long edges of the neighboring sub-regions. Specifically, each of the light-emitting units 111 includes a first sub-region 112 and a second sub-region 113 (shown in FIG. 2). In the first timing, the first sub-region 112 emits a first light L1, and the second sub-region 113 doesn't emit a light. In the second timing, the second sub-region 113 emits a second light L2, and the first sub-region 112 doesn't emit a light.

The material of the first lenticular lens 120 can be glass or poly (methyl methacrylate) (acrylic). The first lenticular lens 120 includes at least one first cylindrical lens 122, and a focal point of the first cylindrical lens 122 is substantially located on one of the light-emitting unit 111. The first cylindrical lens 122 can be a convex lens.

Figure 2:
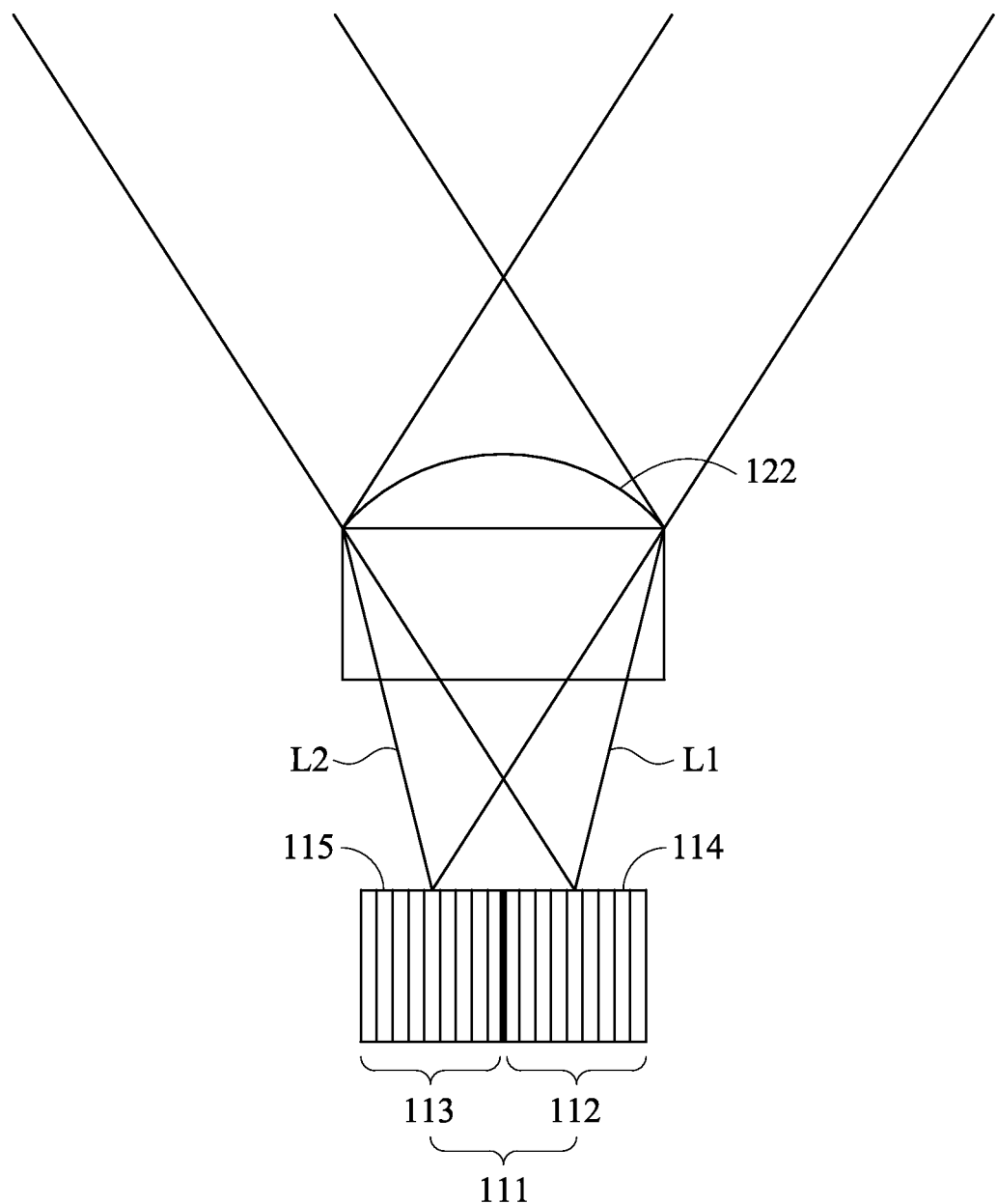
FIG. 2 is a schematic side view of a light-emitting unit and a corresponding first cylindrical lens according to one embodiment of this invention.

FIG. 2 is a schematic side view of the light-emitting unit 111 and the corresponding first cylindrical lens 122 according to one embodiment of this invention. As shown in FIG. 2, the first sub-region 112 includes a plurality of first strip-shaped light sources 114, and the first strip-shaped light sources 114 are disposed side by side. The second sub-region 113 includes a plurality of second strip-shaped light sources 115, and the second strip-shaped light sources 115 are disposed side by side. A deposition position of each of the light-emitting units 111 corresponds to a deposition position of each of the first cylindrical lens 122. When each of the first striped-shaped light source 114 and each of the second strip-shaped light source 115 respectively emit the first light L1 and the second light L2, the first cylindrical lens 122 respectively configured to refract the first light L1 and the second light L2, such that the first light L1 travels toward the left front and that the second light L2 travels toward the right front. The focal point of the first cylindrical lens 122 is located substantially on one of the sub-regions, so the first light L1 becomes substantially a parallel light after the first cylindrical lens 122 refracts the first light L1 emitted by the first strip-shaped light source 114, and the second light L2 becomes substantially a parallel light after the first cylindrical lens 122 refracts the second light L2 emitted by the second strip-shaped light source 115.

As shown in FIG. 1A, FIG. 1B, and FIG. 2, the multi-view auto-stereoscopic display 100 sequentially emits different light in the cycle. Specifically, the first light L1 and the second light L2 are emitted in the cycle. In the first timing, the light source 110 provides the first light L1. When passing the first lenticular lens 120, the first light L1 is refracted and travels toward the left front (compared to a center line C). Then, the first light L1 passes the display module 130 and is transformed into a first pixel light $L_{P1}$. When passing the second lenticular lens 140, the first pixel light $L_{P1}$ is directed toward a plurality of views, such as a first view V1 and a second view V2 shown in FIG. 1A. In the second timing, the light source 110 provides the second light L2, an optical path of the second light L2 is similar to that of the first light L1, and the second light L2 is transformed into the second pixel light $L_{P2}$ and is finally directed toward a third view V3 and a fourth view V4 shown in FIG. 1B.

For the multi-view auto-stereoscopic display 100 with a frequency of 120 Hz, a length of the cycle is about a sixtieth of a second. The light source 110 alternately provides the first light L1 60 times and the second light L2 60 times in one second, and the display module 130 provides 120 images. When the second lenticular lens 140 respectively directs the first pixel light $L_{P1}$ and the second pixel light $L_{P2}$ toward the first view V1, the second view V2, the third view V3, and the fourth view V4, a resolution of the display may be reduced to one half of the original resolution. Compared to conventional technology, in which generating four views may reduce the resolution to a quarter of the original resolution, the decreasing rate of the resolution is significantly reduced as the number of the views increases.

In some embodiments, a number of the timings in the cycle becomes larger than two, such as four or five. When the number of the timing in the cycle increases, that is, when the light source 110 provides more light according to different timings, the decreasing rate of the resolution decreases. In addition, the second lenticular lens 140 may direct the pixel light toward more than two views.

Figure 3A:
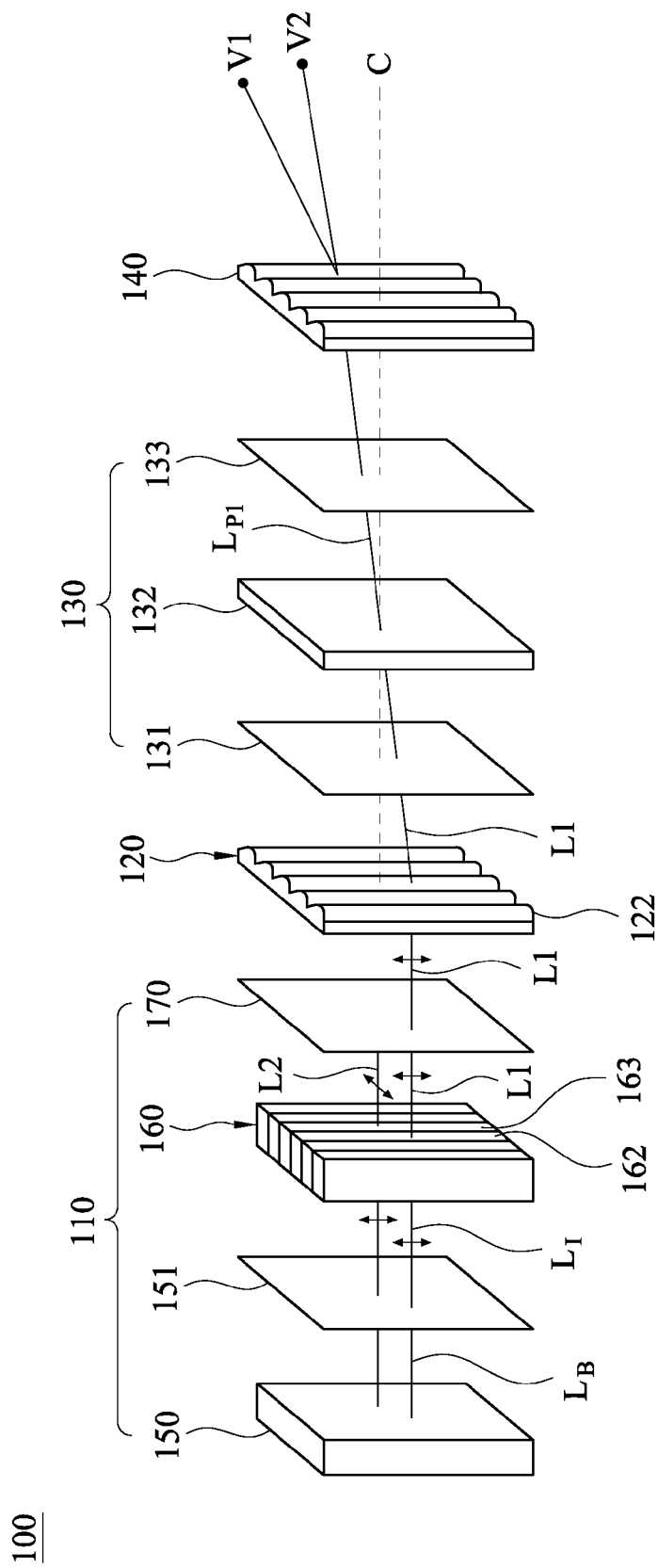
FIG. 3A is a schematic exploded view of the multi-view auto-stereoscopic display in the first timing according to another embodiment of this invention.
Figure 3B:
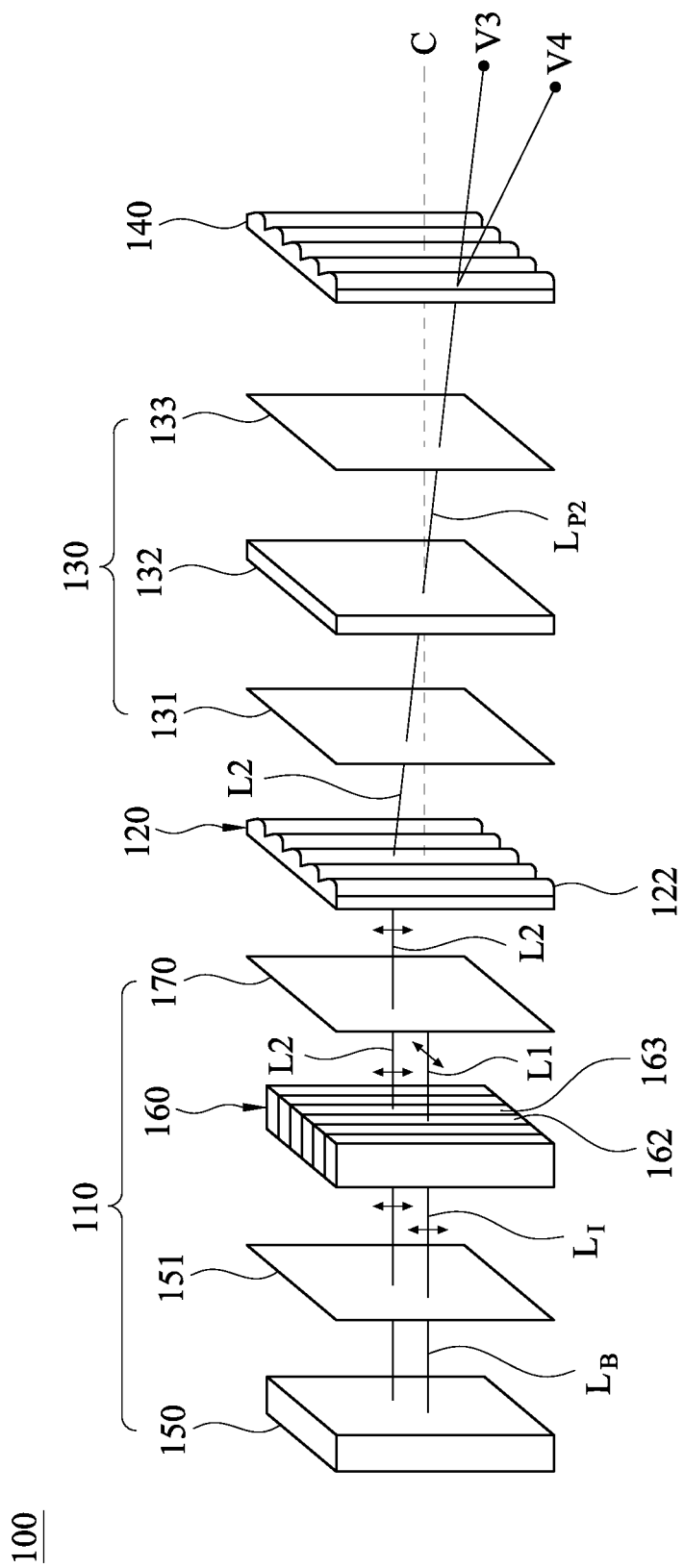
FIG. 3B is a schematic exploded view of the multi-view auto-stereoscopic display of FIG. 3A in the second timing.

FIG. 3A is a schematic exploded view of the multi-view auto-stereoscopic display 100 in the first timing according to another embodiment of this invention. FIG. 3B is a schematic exploded view of the multi-view auto-stereoscopic display 100 of FIG. 3A in the second timing. As shown in FIG. 3A and FIG. 3B, the multi-view auto-stereoscopic display 100 is similar to the multi-view auto-stereoscopic display 100 of FIG. 1A, differences between the two is described in the following. The light source 110 includes a backlight module 150, a first light-entering polarizer 151, a liquid-crystal barrier 160, and a first light-exiting polarizer 170. The backlight module 150 provides a backlight $L_B$. The first light-entering polarizer 151 is disposed in front of the backlight module 150 and transforms the backlight $L_B$ into a polarized state, which is a polarized incident light $L_I$. The liquid-crystal barrier 160 is disposed in front of the first light-entering polarizer 151. The liquid-crystal barrier 160 includes a plurality of sub-regions. The sub-regions respectively transform the polarized incident light $L_I$ into light with different polarizations according to the timings. The first light-exiting polarizer 170 is disposed in front of the liquid-crystal barrier 160. The first light-exiting polarizer 170 allows the light with a specific polarization to exit the light source 110 and blocks the light with a polarization perpendicular to the specific polarization.

The backlight $L_B$ is a light without polarization. After passing the first light-entering polarizer 151, the backlight $L_B$ becomes the polarized incident light $L_I$ in a linear polarized state, and a polarization direction of the polarized incident light $L_I$ may be in a vertical direction shown in FIG. 3A. Then, the polarized incident light $L_I$ may be transformed into light with different polarizations by the liquid-crystal barrier 160. In the first timing, after passing the liquid-crystal barrier 160, the polarized incident light $L_I$ is transformed into the light with different polarizations by different sub-regions. For example, a part of sub-regions transform the light into a light with a first polarization, and the other part of the sub-regions transform the light into a light with a second polarization perpendicular to the first polarization. The polarization direction of the first light-exiting polarizer 170 is parallel to the first polarization, so only the polarized light with the first polarization can emit from the light source 110. Light in the state of the second polarization is blocked by the first light-exiting polarizer 170. In the second timing, the light transformed by the part of the sub-regions which transform the light into light accorded to the second polarization in the first timing and is in the state of the first polarization, and the light transformed by the other part of the sub-regions is in the state of the second polarization perpendicular to the first polarization. Then, only the light with the first polarization may emit from the light source 110, and the light which is in the state of second polarization is blocked by the first light-exiting polarizer 170. Consequently, the light passing through different sub-regions may emit from the light module 110 in different timing of the cycle.

Specifically, the liquid-crystal barrier 160 includes a plurality of first sub-region 162 and a plurality of second sub-region 163. The first sub-regions 162 and the second sub-regions 163 are alternatively disposed side by side. As shown in FIG. 3A, in the first timing, the first sub-regions 162 transform the polarized incident light $L_I$ into the first light L1 with the first polarization, that is, a vertical polarization. The second sub-regions 163 transform the polarized incident light $L_I$ into the second light L2 with the second polarization, that is, a horizontal polarization. Therefore, only the first light L1 emits from the light source 110, and the second light L2 is blocked by the first light-exiting polarizer 170.

As shown in FIG. 3B, in the second timing, the first light L1 transformed by the first sub-region 162 is in the state of second polarization, that is, the horizontal polarization, and the second light L2 is in the state of first polarization. Therefore, only the second light L2 emit from the light source 110, and the first light L1 is blocked by the first light-exiting polarizer 170.

As shown in FIG. 3A and FIG. 3B, the display module 130 includes a second light-entering polarizer 131, a liquid-crystal panel 132, and a second light-exiting polarizer 133. The second light-entering polarizer 131 allows the light from the first lenticular lens 120 to enter the display module 130 and blocks the light with a polarization perpendicular to a polarization direction of the second light-entering polarizer 131. The liquid-crystal panel 132 is disposed in front of the second light-entering polarizer 131 and transforms the light entering the display module 130 into the pixel light. The second light-exiting polarizer 133 is disposed in front of the liquid-crystal panel 132 and allows the pixel light to exit the display module 130.

The polarization direction of the second light-entering polarizer 131 is parallel to the polarization direction of the first light-exiting polarizer 170, so the light L1 and L2 emitting from the light source 110 is not influenced. When passing the liquid-crystal panel 132, the light L1 and L2 are respectively transformed into a first pixel light $L_{P1}$ and a second pixel light $L_{P2}$ with pixel information.

The liquid-crystal barrier 160 may be composed of liquid-crystal pixels. Therefore, the first sub-region 162 and the second sub-region 163 may generate light with the vertical polarization or the horizontal polarization in different timing by controlling the polarization direction of the liquid-crystal pixels. For example, in the first timing, the first sub-region 162 generates a light with vertical polarization, and the second sub-region 163 generates a light with horizontal polarization. In the second timing, the first sub-region 162 generates a light with the horizontal polarization, and the second sub-region 163 generates a light with the vertical polarization. The liquid-crystal barrier 160 and the display module 130 are both controlled by controlling the liquid-crystal pixels, the liquid-crystal barrier 160 and the display module 130 may use a synchronous drive module, specifically, a synchronous scan module. Therefore, the liquid-crystal barrier 160 and the display module 130 are synchronized when scanning and renewing the pixel information, and a display quality of the multi-view auto-stereoscopic display 100 is enhanced.

Figure 4:
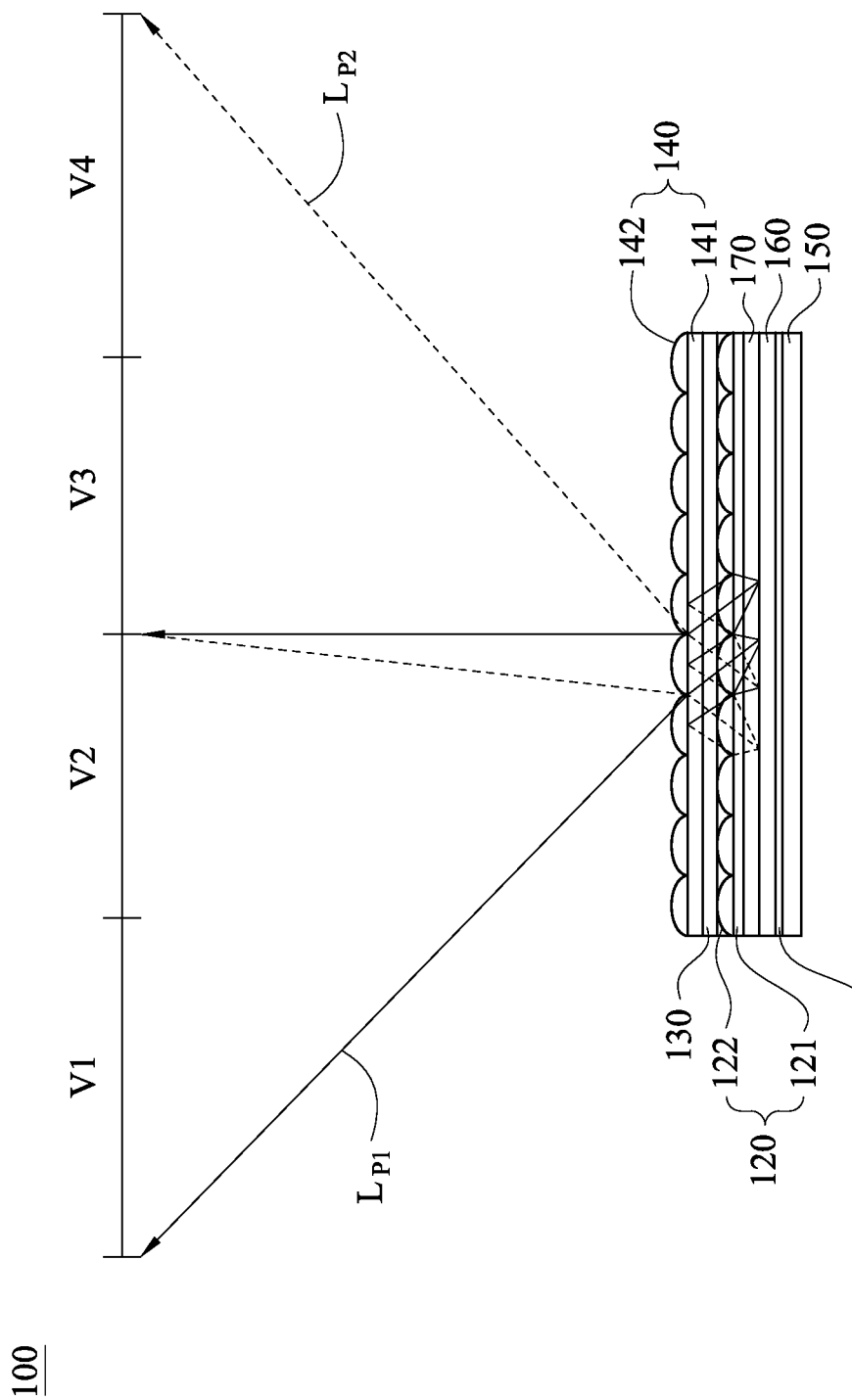
FIG. 4 is a schematic side view of the multi-view auto-stereoscopic display of FIG. 3A.

FIG. 4 is a schematic side view of the multi-view auto-stereoscopic display 100 of FIG. 3A. As show in FIG. 4, the first lenticular lens 120 includes a first body 121 and the first cylindrical lens 122 disposed on the first body 121. The second lenticular lens 140 includes a second body 141 and at least one second cylindrical lens 142 disposed on the second body 141. In the first timing, the first pixel light $L_{P1}$ passes the second lenticular lens 140 and is directed toward the first view V1 and the second view V2. In the second timing, the second pixel light $L_{P2}$ is directed toward the third view V3 and the fourth V4. For clearly describing optical paths, only the first pixel light $L_{P1}$ and the second pixel light $L_{P2}$ passing one of the second cylindrical lenses 142 are illustrated.

The second cylindrical lens 142 may be a convex lens. People having ordinary skill in the art can make proper modifications to the second cylindrical lens 142 according to their actual needs.

Figures 5A, 5B:
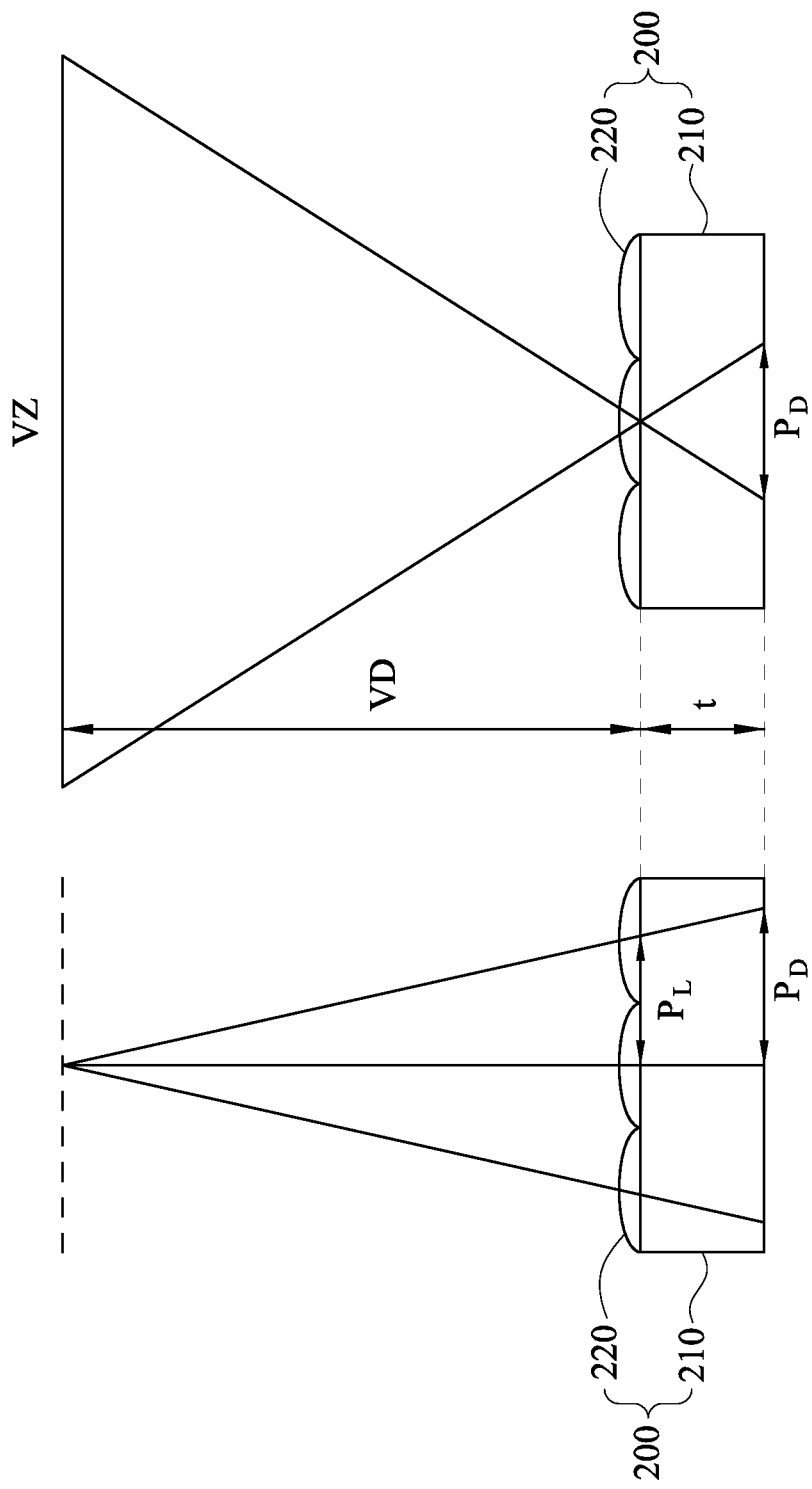
FIG. 5A and FIG. 5B are schematic side views of a conventional multi-view auto-stereoscopic display.

FIG. 5A and FIG. 5B are schematic side views of a conventional multi-view auto-stereoscopic display. As shown in FIGS. 5A and 5B, structural parameters of the lenticular lens 200 are derived. A conventional multi-view auto-stereoscopic display usually has a viewing distance VD, and if considering associated conditions of a thin lens and the paraxial optics, a relation can be derived from similar triangles of FIG. 5A:

$$P_D = \frac{VD + t/n}{VD} \times P_L$$

where $P_D$ is an approximate length of a optical axis (a length of a projection on a bottom surface of a body 210 after light passes centers of two adjacent cylindrical lenses 220), $P_L$ is a pitch (lens width) of the cylindrical lens 220, t is a thickness of the body 210, n is a refractive index of the body 210, and VD is the viewing distance.

In addition, a relation can be derived from FIG. 5B:

$$VZ = \frac{VD}{t/n} \times P_D = \frac{VD + t/n}{t/n} \times P_L$$

where VZ is a width of a viewing zone. Therefore, a relation between the viewing zone VZ and the pitch $P_L$ can be known.

In order to optimize the display quality of each of the views of the multi-view auto-stereoscopic display 100, a relation should be satisfied:

$$VZ_1 = m \times VZ_2 (m=2,3,4,\ldots)$$

where m is the number of the light provided by the light source 110 in the cycle, that is, the number of the timings, $VZ_1$ is a width of a viewing zone of a first cylindrical lens 122, and $VZ_2$ is a width of a viewing zone of the second cylindrical lens 142.

Figure 6A:
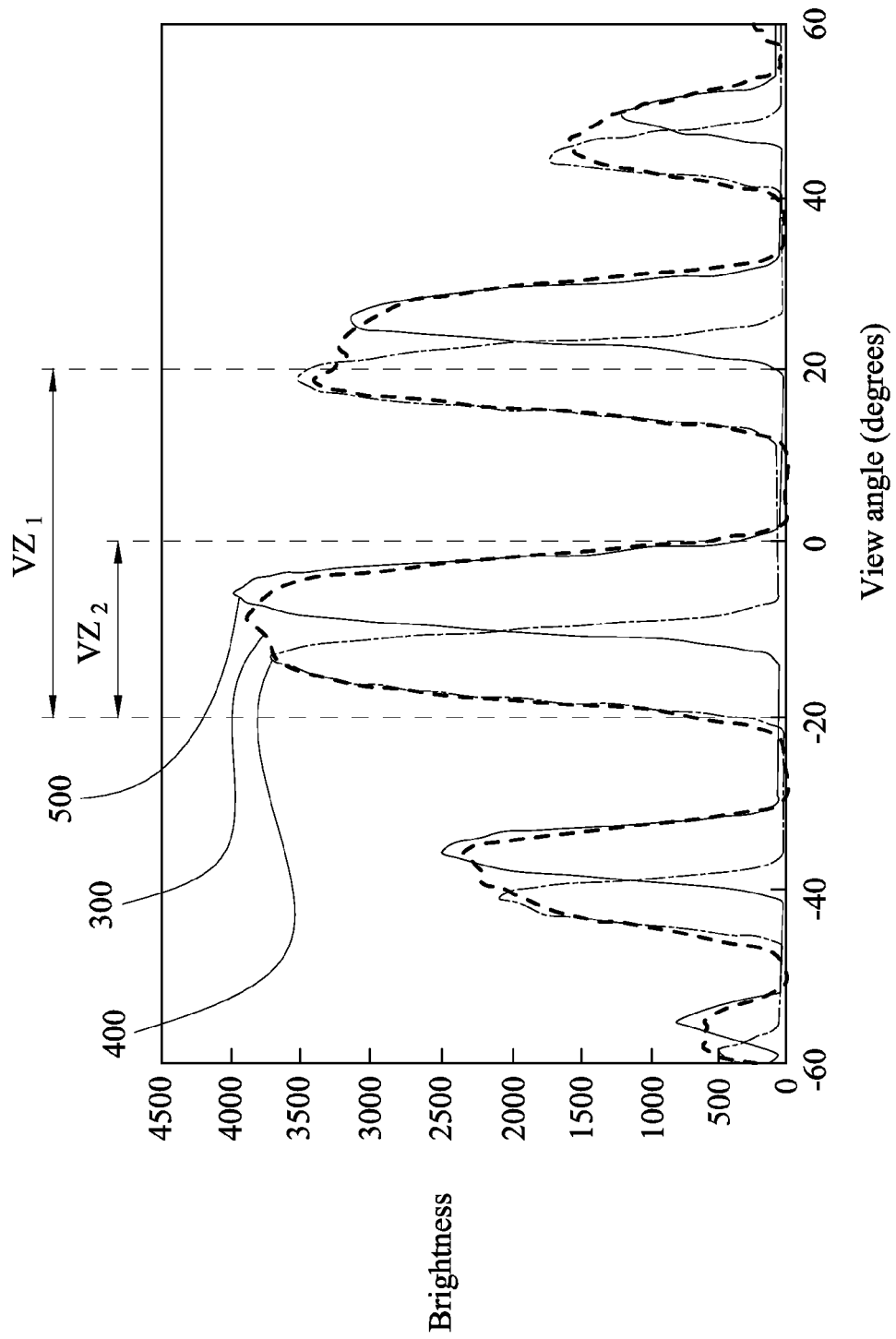
FIG. 6A is a brightness to view angle figure of the multi-view auto-stereoscopic display of FIG. 3A.
Figure 6B:
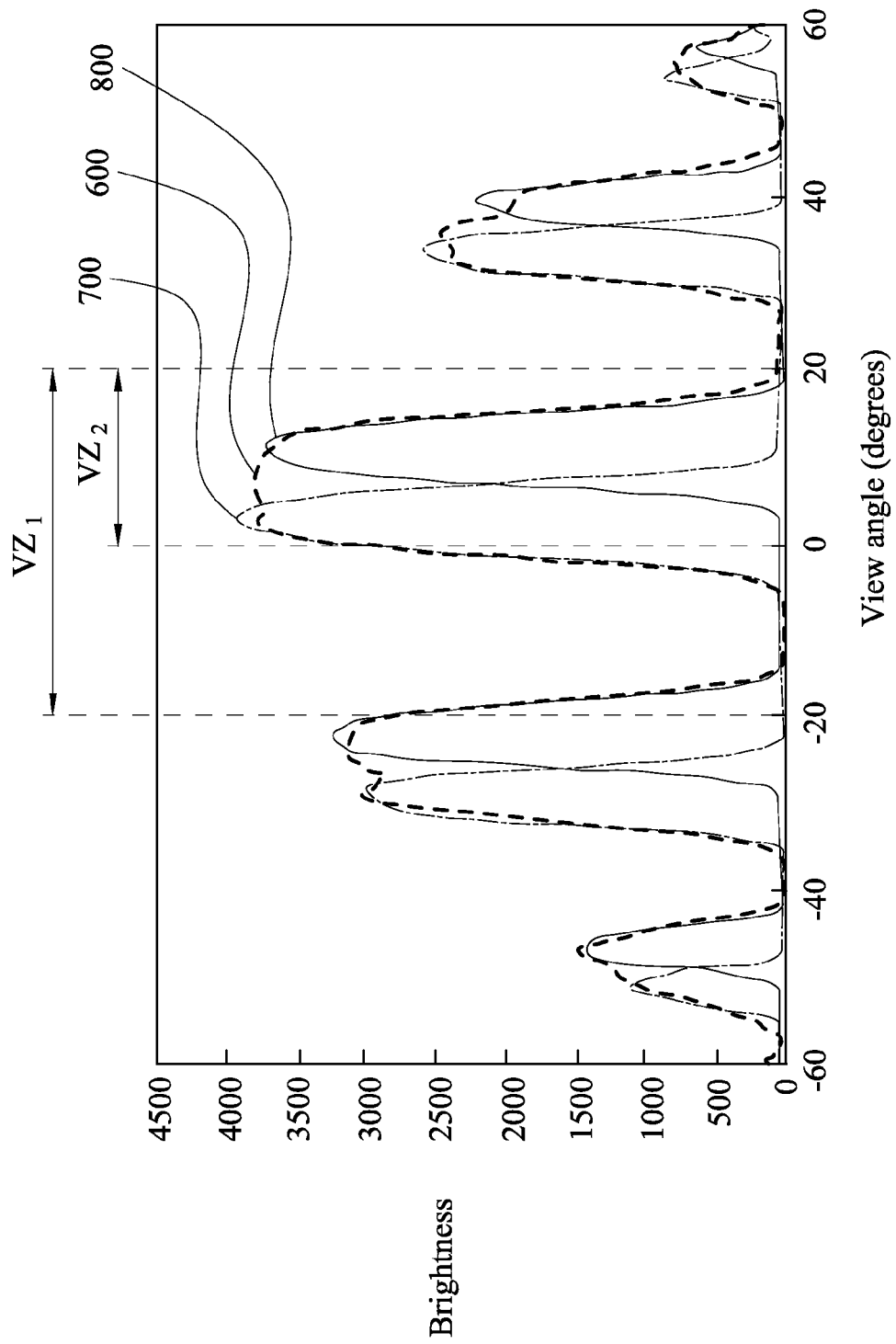
FIG. 6B is a brightness to view angle figure of the multi-view auto-stereoscopic display of FIG. 3B.

FIG. 6A is a brightness to view angle figure of the multi-view auto-stereoscopic display of FIG. 3A. FIG. 6B is a brightness to view angle figure of the multi-view auto-stereoscopic display of FIG. 3B. As shown in FIG. 6A, a curve 300 illustrates the relation of the brightness and the view angle of the first light L1 (shown in FIG. 3A) reflected by the first lenticular lens 120 (shown in FIG. 3A). The first light L1 (shown in FIG. 3A) becomes the first pixel light $L_{P1}$ after passing the display module 130 and is directed toward the first view V1 (shown in FIG. 3A) and the second view V2 (shown in FIG. 3A) after passing the second lenticular lens 140 (shown in FIG. 3A). Thus, a curve 400 and a curve 500 are formed. The curve 400 illustrates the relation of the brightness and the view angle of the light directed toward the first view V1. The curve 500 illustrates the relation of the brightness and the view angle of the light directed toward the first view V2. As shown in FIG. 6B, a curve 600 illustrates the relation of the brightness and the view angle of the second light L2 (shown in FIG. 3B) reflected by the first lenticular lens 120 (shown in FIG. 3B). The second light L2 (shown in FIG. 3B) becomes the second pixel light $L_{P2}$ after passing the display module 130 and is then directed toward the third view V3 (shown in FIG. 3B) and the fourth view V4 (shown in FIG. 3B) after passing the second lenticular lens 140 (shown in FIG. 3A). Thus, a curve 700 and a curve 800 are formed. The curve 400 illustrates the relation of the brightness and the view angle of the light directed toward the third view V3. The curve 800 illustrates the relation of the brightness and the view angle of the light directed toward the fourth view V4.

When m=2 and the relation $VZ_1 = 2VZ_2$ is satisfied, the relation between the brightness and the view angle of the multi-view auto-stereoscopic display 100 is as shown in FIG. 6A and FIG. 6B. Specifically, the first light L1 and the second light L2 in the first timing and the second timing are respectively distributed in view angle ranges from about −20 to 0 degrees and from about 0 to 20 degrees, so the viewing zone $VZ_1$ of the first cylindrical lens 122 of the first lenticular lens 120 is about 40 degrees. The light directed toward the first view V1 and the second view V2 by the second lenticular lens 140 in the first timing is distributed in view angle ranges from about −20 to −10 degrees and from about −10 to 0 degrees, and the light directed toward the third view V3 and the fourth view V4 by the second lenticular lens 140 in the second timing is distributed in view angle ranges from about 0 to 10 degrees and from about 10 to 20 degrees. The viewing zone $VZ_2$ of the second cylindrical lens 142 of the second lenticular lens 140 is about 20 degrees. Therefore, the relation $VZ_1 = 2VZ_2$ is satisfied.

When the relation $VZ_1 = 2VZ_2$ is satisfied, an optimized display effect may be generated by the first lenticular lens 120 and the second lenticular lens 140. As shown in FIG. 6A, the curve 300 and the curve 400 overlap in a view angle range from about −20 to −10 degrees, so the first view with an optimized brightness overlapping effect is generated. The curve 300 and the curve 500 overlap in a view angle range from about −10 to 0 degrees, so the second view with an optimized brightness overlapping effect is generated. As shown in FIG. 6B, the curve 600 and the curve 700 overlap in a view angle range from about 0 to 10 degrees, so the third view with an optimized brightness overlapping effect is generated. The curve 600 and the curve 800 overlap in a view angle range from about 10 to 20 degrees, so the fourth view with an optimized brightness overlapping effect is generated.

Figure 7:
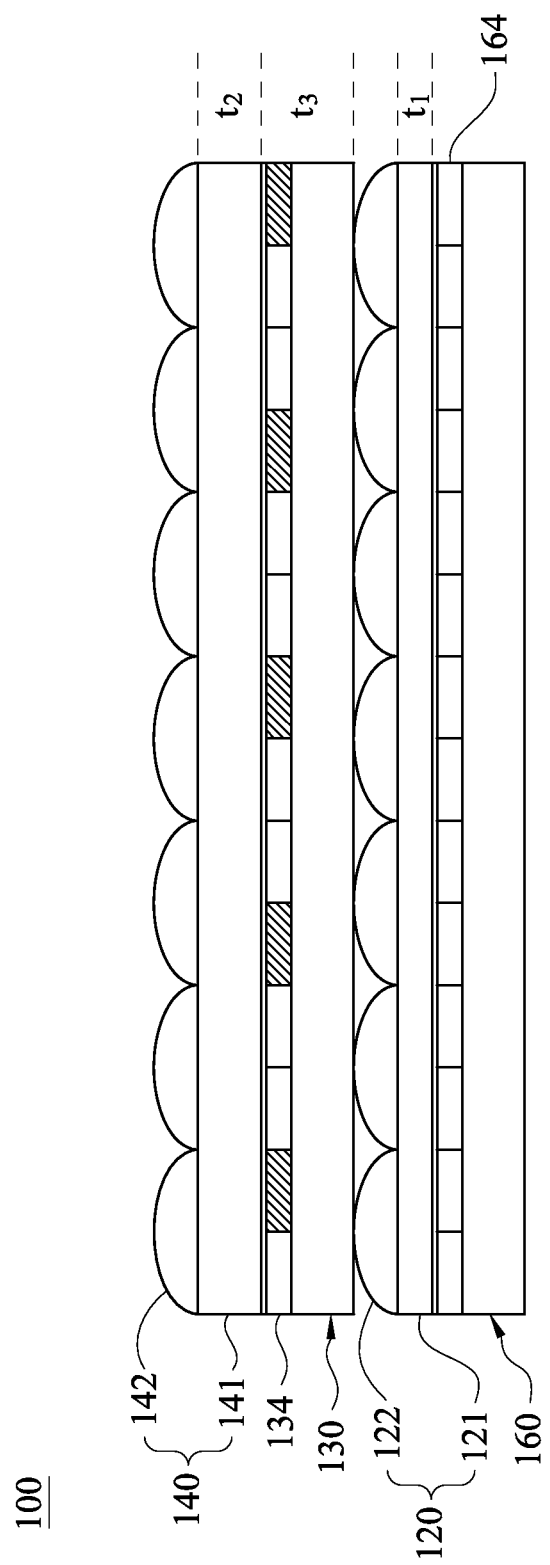
FIG. 7 is another side view of the multi-view auto-stereoscopic display of FIG. 3A.

FIG. 7 is another side view of the multi-view auto-stereoscopic display 100 of FIG. 3A. The display module 130 further includes a display pixel layer 134. The liquid-crystal barrier 160 further includes a liquid-crystal pixel layer 164.

Different structure parameter relations of the multi-view auto-stereoscopic display 100 are derived in the following:

$$VZ_1 = m \times VZ_2$$

$$\frac{(VD + t'_2 + t'_3) + t'_1}{t'_1} \times P_{L1} = m \times \frac{VD + t'_2}{t'_2} \times P_{L2}$$

$$\frac{VD}{t'_1} \times P_{L1} \cong m \times \frac{VD}{t'_2} \times P_{L2} \text{ (if } t'_1, t'_2, t'_3 << VD)$$

$$\frac{P_{L1}}{t_1/n_1} = m \times \frac{P_{L2}}{t_2/n_2}$$

where $t_1$ and $n_1$ are a first thickness and a first refractive index of the first body 121, $t_1'$ equals $t_1/n_1$, $t_2$ and $n_2$ are a second thickness and a second refractive index of the second body 141, $t_2'$ equals $t_2/n_2$, $t_3$ and $n_3$ are a third thickness and a third refractive index of the display module 130, $t_3'$ equals $t_3/n_3$, $P_{L1}$ is a first pitch of second cylindrical lens 122, $P_{L2}$ is a second pitch of second cylindrical lens 142, and a thickness of the first cylindrical lens 122 is relatively small and thus is neglected.

Therefore, a relation between the first pitch $P_{L1}$ and the second pitch $P_{L2}$ is obtained. By adjusting the aforementioned structure parameter relations of the multi-view auto-stereoscopic display 100, the multi-view display effect of the multi-view auto-stereoscopic display 100 may be optimized.

Specifically, a focal point of the first cylindrical lens 122 is substantially located at the liquid-crystal pixel layer 164 of the liquid-crystal barrier 160. A focal point of the second cylindrical lens 142 is substantially located at the display pixel layer 134 of the liquid-crystal barrier 160.

Figure 8A:
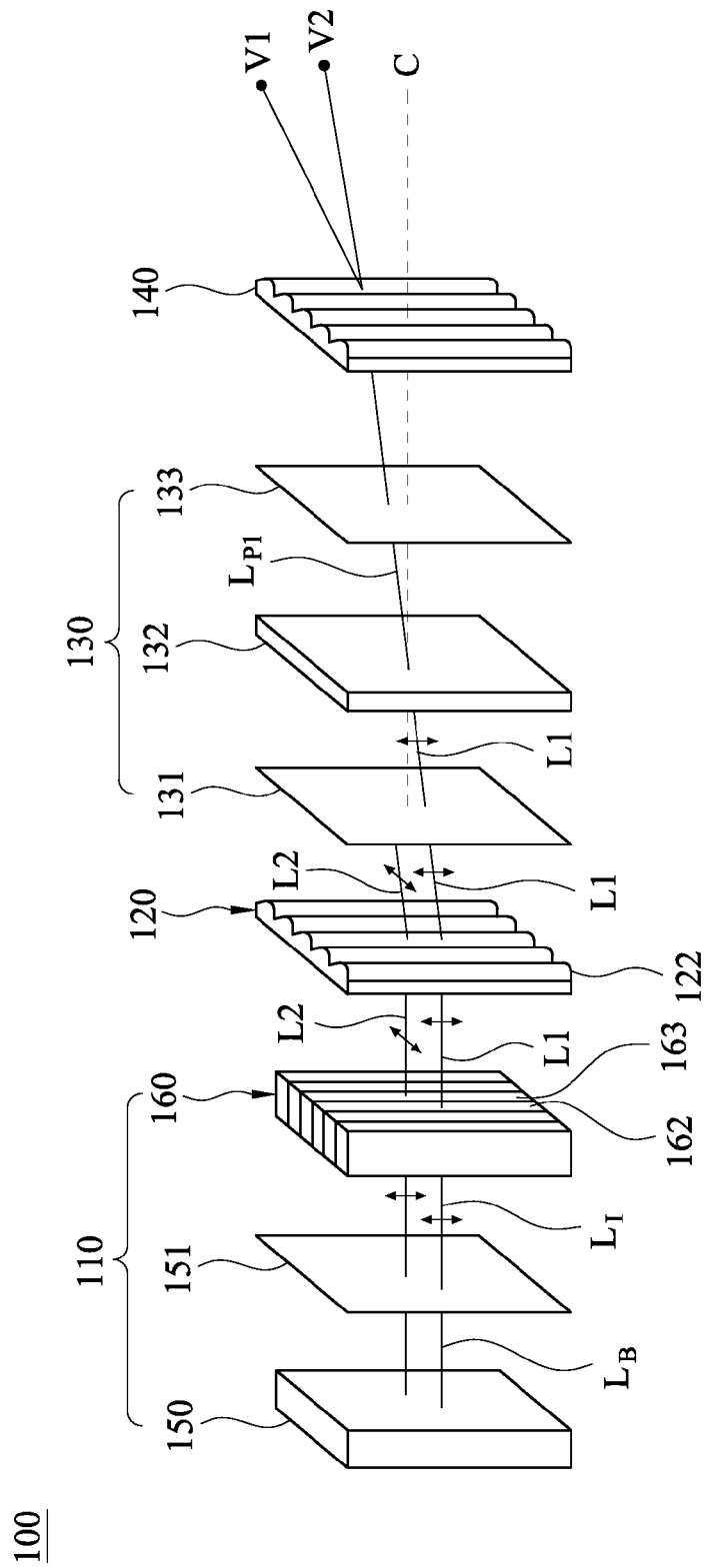
FIG. 8A is a schematic exploded view of the multi-view auto-stereoscopic display in the first timing according to another embodiment of this invention.
Figure 8B:
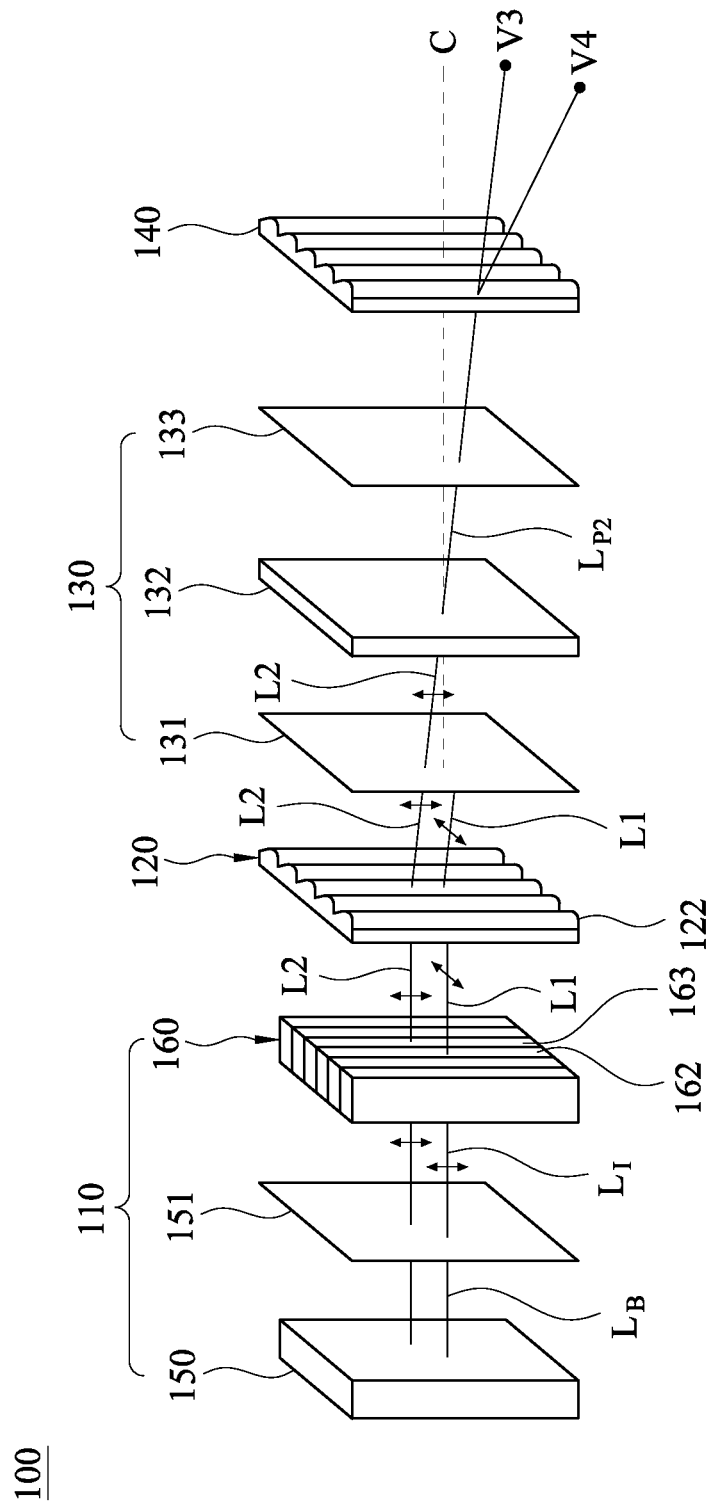
FIG. 8B is a schematic exploded view of the multi-view auto-stereoscopic display of FIG. 8A in the second timing.

FIG. 8A is a schematic exploded view of the multi-view auto-stereoscopic display 100 in the first timing according to another embodiment of this invention. FIG. 8B is a schematic exploded view of the multi-view auto-stereoscopic display 100 of FIG. 8A in the second timing. As shown in FIG. 8A and FIG. 8B, the multi-view auto-stereoscopic display 100 of FIG. 8A and FIG. 8B is similar to the multi-view auto-stereoscopic display 100 of FIG. 3A and FIG. 3B, and the only difference is that the multi-view auto-stereoscopic display 100 doesn't have the first light-exiting polarizer 170 shown in FIG. 3A and FIG. 3B, so the function of the first light-exiting polarizer 170 is performed by the second light-entering polarizer 131, that is, the second light-entering polarizer 131 allows the light from the first lenticular lens 120 and with a specific polarization to enter the display module 130 and blocks the light with a polarization perpendicular to the specific polarization.

Specifically, as shown in FIG. 8A, in the first timing, the first sub-regions 162 transform the polarized incident light $L_I$ into the first light L1 with the vertical polarization. The second sub-regions 163 transform the polarized incident light $L_I$ into the second light L2 with the horizontal polarization. Then, both the first light L1 and the second light L2 emits from the light source 110, and then the first light L1 and the second light L2 are refracted by the first cylindrical lens 122, such that the first light L1 and the second light L2 travels toward the left front. The second light-entering polarizer 131 allows only light with vertical polarization to enter the display module 130 and blocks the light with horizontal polarization, only the first light L1 enters the display module 130. The optical path after the display module 130 is the same as shown in FIG. 3A.

As shown in FIG. 8B, in the second timing, the first sub-regions 162 transform the polarized incident light $L_I$ into the first light L1 with the horizontal polarization. The second sub-regions 163 transform the polarized incident light $L_I$ into the second light L2 with the vertical polarization. Then, both the first light L1 and the second light L2 emits from the light source 110, and then the first light L1 and the second light L2 are refracted by the first cylindrical lens 122, such that the first light L1 and the second light L2 travels toward the right front. The second light-entering polarizer 131 allows only light with vertical polarization to enter the display module 130 and blocks the light with horizontal polarization, only the second light L2 enters the display module 130. The optical path after the display module 130 is the same as shown in FIG. 3B.

The first lenticular lens 120 may be a fixed lenticular lens, that is, the refractive index of the lenticular lens 120 is fixed, and a focal length of the first cylindrical lens 122 is fixed as well. The second lenticular lens 140 may be a fixed lenticular lens. FIG. 9 is a schematic exploded view of the multi-view auto-stereoscopic display 100 according to another embodiment of this invention. As shown in FIG. 9, the multi-view auto-stereoscopic display 100 of FIG. 9 is similar to the multi-view auto-stereoscopic display 100 of FIG. 3A, the only difference is that the second lenticular lens 140' is a switchable lenticular lens. Specifically, the second lenticular lens 140' is made of a material with gradient-index, which is often liquid-crystal, so the function of refracting light may be turned on or off when the second lenticular lens 140' is powered or non-powered. When the second lenticular lens 140' is powered, the optical characteristics of the second lenticular lens 140' is the same as a lens with a focal length, so the multi-view auto-stereoscopic display 100 may generate a plurality of views and have stereoscopic display effect. When the second lenticular lens 140' is non-powered, the optical characteristics of the second lenticular lens is the same as a planar glass without focal length, so the second lenticular lens 140' doesn't have the function of refracting light. In addition, the light source 110 provides light passing all of the sub-regions at the same time. Therefore, the multi-view auto-stereoscopic display 100 generates a planar image.

The light source sequentially emits light passing different sub-regions in a cycle, and then the first lenticular lens respectively directs the light passing different sub-regions to travel in different directions, such that a plurality of light traveling in different directions are generated in a cycle. After the light is emitted into the display module and the second lenticular lens, the light traveling in different directions are respectively directed toward different views by the second lenticular lens. Therefore, the number of the views generated in a cycle by the multi-view auto-stereoscopic display increases, and the decreasing rate of the resolution is reduced when the number of the views increases.

All the features disclosed in this specification (including any accompanying claims, abstract, and drawings) may be replaced by alternative features serving the same, equivalent or similar purposes, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A multi-view auto-stereoscopic display, comprising:
a light source, configured to sequentially provide a plurality of light according to a plurality of timings in a cycle, the light source comprising:
   a backlight module, configured for providing a backlight;
   a first light-entering polarizer disposed in front of the backlight module, configured to transform the backlight into a polarized incident light; and
   a liquid-crystal barrier disposed in front of the first light-entering polarizer, the liquid-crystal barrier comprising:
      a plurality of sub-regions, configured for respectively transforming the polarized incident light into the light with different polarizations according to the timings;
a first lenticular lens disposed in front of the light source, configured to respectively direct the light from the light source to travel in a plurality of directions;
a display module disposed in front of the first lenticular lens, configured for transforming the light from the first lenticular lens into a plurality of pixel light; and
a second lenticular lens disposed in front of the display module, configured for respectively directing the pixel light toward a plurality of views.

2. The multi-view auto-stereoscopic display of claim 1, wherein the first lenticular lens comprises a first body and at least one first cylindrical lens disposed on the first body, the first body has a first thickness t1 and a first refractive index n1, the first cylindrical lens has a first pitch PL1, the second lenticular lens comprises a second body and at least one second cylindrical lens disposed on the second body, the second body has a second thickness t2 and a second refractive index n2, the second cylindrical lens has a second pitch PL2, a number of the timings is m, and a following relation is satisfied by the first lenticular lens and the second lenticular lens:

$$\frac{P_{L1}}{t_1/n_1} = m \times \frac{P_{L2}}{t_2/n_2}.$$

3. The multi-view auto-stereoscopic display of claim 1, wherein the first lenticular lens comprises a first body and at least one first cylindrical lens disposed on the first body, the first body has a first thickness t1 and a first refractive index n1, the first cylindrical lens has a first pitch PL1, the second lenticular lens comprises a second body and at least one second cylindrical lens disposed on the second body, the second body has a second thickness t2 and a second refractive index n2, the second cylindrical lens has a second pitch PL2, a number of the timings is m, and a following relation is satisfied by the first lenticular lens and the second lenticular lens:

$$\frac{P_{L1}}{t_1/n_1} = m \times \frac{P_{L2}}{t_2/n_2}.$$

4. The multi-view auto-stereoscopic display of claim 1, wherein the first lenticular lens comprises at least one first cylindrical lens, and a focal point of the first cylindrical lens is substantially located on one of the sub-regions.

5. The multi-view auto-stereoscopic display of claim 4, wherein the first lenticular lens comprises a first body and at least one first cylindrical lens disposed on the first body, the first body has a first thickness t1 and a first refractive index n1, the first cylindrical lens has a first pitch PL1, the second lenticular lens comprises a second body and at least one second cylindrical lens disposed on the second body, the second body has a second thickness t2 and a second refractive index n2, the second cylindrical lens has a second pitch PL2, a number of the timings is m, and a following relation is satisfied by the first lenticular lens and the second lenticular lens:

$$\frac{P_{L1}}{t_1/n_1} = m \times \frac{P_{L2}}{t_2/n_2}.$$

6. The multi-view auto-stereoscopic display of claim 1, wherein the display module comprises:
a second light-entering polarizer, configured for allowing the light from the first lenticular lens and with a specific polarization to enter the display module and blocking the light with a polarization perpendicular to the specific polarization;
a liquid-crystal panel disposed in front of the second light-entering polarizer, configured for transforming the light entering the display module into the pixel light; and
a second light-exiting polarizer disposed in front of the liquid-crystal panel, configured for allowing the pixel light to exit the display module.

7. The multi-view auto-stereoscopic display of claim 6, wherein the first lenticular lens comprises a first body and at least one first cylindrical lens disposed on the first body, the first body has a first thickness t1 and a first refractive index n1, the first cylindrical lens has a first pitch PL1, the second lenticular lens comprises a second body and at least one second cylindrical lens disposed on the second body, the second body has a second thickness t2 and a second refractive index n2, the second cylindrical lens has a second pitch PL2, a number of the timings is m, and a following relation is satisfied by the first lenticular lens and the second lenticular lens:

$$\frac{P_{L1}}{t_1/n_1} = m \times \frac{P_{L2}}{t_2/n_2}.$$

8. The multi-view auto-stereoscopic display of claim 1, wherein the light source comprising:
a backlight module, configured for providing a backlight;
a first light-entering polarizer disposed in front of the backlight module, configured for transforming the backlight into a polarized incident light;
a liquid-crystal barrier disposed in front of the first light-entering polarizer, the liquid-crystal barrier comprising:
   a plurality of sub-regions, configured for respectively transforming the polarized incident light into light with different polarizations according to timings; and
a first light-exiting polarizer, for allowing the light with a specific polarization to exit the light source and blocking the light with a polarization perpendicular to the specific polarization.

9. The multi-view auto-stereoscopic display of claim 8, wherein the first lenticular lens comprises a first body and at least one first cylindrical lens disposed on the first body, the first body has a first thickness t1 and a first refractive index n1, the first cylindrical lens has a first pitch PL1, the second lenticular lens comprises a second body and at least one second cylindrical lens disposed on the second body, the second body has a second thickness t2 and a second refractive index n2, the second cylindrical lens has a second pitch PL2, a number of the timings is m, and a following relation is satisfied by the first lenticular lens and the second lenticular lens:

$$\frac{P_{L1}}{t_1/n_1} = m \times \frac{P_{L2}}{t_2/n_2}.$$

10. The multi-view auto-stereoscopic display of claim 8, wherein the display module comprises:
   a second light-entering polarizer, configured for allowing the light from the first lenticular lens to enter the display module and blocking the light with a polarization perpendicular to a polarization direction of the second light-entering polarizer;
   a liquid-crystal panel disposed in front of the second light-entering polarizer, configured for transforming the light entering the display module into the pixel light; and
   a second light-exiting polarizer disposed in front of the liquid-crystal panel, configured for allowing the pixel light to exit the display module.

11. The multi-view auto-stereoscopic display of claim 10, wherein the first lenticular lens comprises a first body and at least one first cylindrical lens disposed on the first body, the first body has a first thickness t1 and a first refractive index n1, the first cylindrical lens has a first pitch PL1, the second lenticular lens comprises a second body and at least one second cylindrical lens disposed on the second body, the second body has a second thickness t2 and a second refractive index n2, the second cylindrical lens has a second pitch PL2, a number of the timings is m, and a following relation is satisfied by the first lenticular lens and the second lenticular lens:

$$\frac{P_{L1}}{t_1/n_1} = m \times \frac{P_{L2}}{t_2/n_2}.$$

12. The multi-view auto-stereoscopic display of claim 1, wherein the first lenticular lens is a fixed lenticular lens.

13. The multi-view auto-stereoscopic display of claim 12, wherein the first lenticular lens comprises a first body and at least one first cylindrical lens disposed on the first body, the first body has a first thickness t1 and a first refractive index n1, the first cylindrical lens has a first pitch PL1, the second lenticular lens comprises a second body and at least one second cylindrical lens disposed on the second body, the second body has a second thickness t2 and a second refractive index n2, the second cylindrical lens has a second pitch PL2, a number of the timings is m, and a following relation is satisfied by the first lenticular lens and the second lenticular lens:

$$\frac{P_{L1}}{t_1/n_1} = m \times \frac{P_{L2}}{t_2/n_2}.$$

14. The multi-view auto-stereoscopic display of claim 1, wherein the second lenticular lens is a fixed lenticular lens.

15. The multi-view auto-stereoscopic display of claim 14, wherein the first lenticular lens comprises a first body and at least one first cylindrical lens disposed on the first body, the first body has a first thickness t1 and a first refractive index n1, the first cylindrical lens has a first pitch PL1, the second lenticular lens comprises a second body and at least one second cylindrical lens disposed on the second body, the second body has a second thickness t2 and a second refractive index n2, the second cylindrical lens has a second pitch PL2, a number of the timings is m, and a following relation is satisfied by the first lenticular lens and the second lenticular lens:

$$\frac{P_{L1}}{t_1/n_1} = m \times \frac{P_{L2}}{t_2/n_2}.$$

16. The multi-view auto-stereoscopic display of claim 1, wherein the second lenticular lens is a switchable lenticular lens.

17. The multi-view auto-stereoscopic display of claim 16, wherein the first lenticular lens comprises a first body and at least one first cylindrical lens disposed on the first body, the first body has a first thickness t1 and a first refractive index n1, the first cylindrical lens has a first pitch PL1, the second lenticular lens comprises a second body and at least one second cylindrical lens disposed on the second body, the second body has a second thickness t2 and a second refractive index n2, the second cylindrical lens has a second pitch PL2, a number of the timings is m, and a following relation is satisfied by the first lenticular lens and the second lenticular lens:

$$\frac{P_{L1}}{t_1/n_1} = m \times \frac{P_{L2}}{t_2/n_2}.$$

* * * * *